United States Patent [19]
Yamada et al.

[11] Patent Number: 5,950,222
[45] Date of Patent: Sep. 7, 1999

[54] MICROCOMPUTER USING A NON-VOLATILE MEMORY

[75] Inventors: Susumu Yamada; Toru Watanabe; Nobuhiro Arai; Toshikazu Abe, all of Moriguchi, Japan

[73] Assignee: Sanyo Electric Co., Ltd., Osaka, Japan

[21] Appl. No.: 08/811,572

[22] Filed: Mar. 5, 1997

[30] Foreign Application Priority Data

| Mar. 14, 1996 | [JP] | Japan | 8-057706 |
| Mar. 29, 1996 | [JP] | Japan | 8-076815 |
| Apr. 17, 1996 | [JP] | Japan | 8-095452 |

[51] Int. Cl.[6] .................................................. G06F 12/00
[52] U.S. Cl. ............................................................. 711/103
[58] Field of Search .............................. 395/733; 711/103

[56] References Cited

U.S. PATENT DOCUMENTS

| 5,293,591 | 3/1994 | Dettmer | 395/733 X |
| 5,351,216 | 9/1994 | Salt et al. | 711/103 X |
| 5,812,867 | 9/1998 | Basset | 395/800.01 |

*Primary Examiner*—David L. Robertson
*Attorney, Agent, or Firm*—Loeb & Loeb LLP

[57] ABSTRACT

An EEPROM (1) is set to write mode when a program command to commence rewriting of data in region B in the EEPROM (1) is read out from region A. A CPU (2) then writes data specified by a latch (6) at an address in region B specified by a latch (4). In compliance with an inhibit signal INH, the CPU (2) now disregards the effects of the undefined output from the EEPROM (1) terminal DOUT.

12 Claims, 8 Drawing Sheets

MICROCOMPUTER USING A NON-VOLATILE MEMORY

BACKGROUND OF THE INVENTION

1. Field of the Invention

The present invention relates to a microcomputer containing an EEPROM (Electrically Erasable Programmable ROM) as a flash memory.

2. Description of the Related Art

A 1-chip microcomputer has a programmable memory (non-volatile memory) integrated over a single chip. A mask ROM, EPROM, EEPROM or the like is used as the programmable memory.

(1) Mask ROM

A microcomputer containing a mask ROM has the advantage that production efficiency can be improved and chip area reduced by manufacturing a plurality of masks in one batch. However, in the event of reprogramming, the plurality of masks must be re-manufactured, resulting in the disadvantages that considerable manufacturing time is required and the reprogramming request cannot be dealt with swiftly.

(2) EPROM

Use of an EPROM offers the advantage that a reprogramming request can be responded to swiftly by ultravioletly erasing the present data prior to writing in new data. However, since all present data are thereby ultravioletly erased, there is the drawback that data which did not require erasure must be rewritten.

(3) EEPROM

Use of an EEPROM offers the advantage that a reprogramming request can be responded to swiftly by electrically erasing the present data prior to writing in new data. In addition, since present data can be partially erased, data which do not need to be erased can be retained.

Recent 1-chip microcomputers utilize the advantages of all non-volatile memories and contain an EEPROM and a mask ROM. The EEPROM is used as a programmable memory for controlling the operation of the 1-chip microcomputer; the mask ROM is used as a programmable memory for rewriting EEPROM data.

As a result, the 1-chip microcomputer can rewrite EEPROM data by itself with an improved level of versatility.

However, when the EEPROM data is to be reprogrammed, the mask for the mask ROM must be newly manufactured, with the resulting problem that it is not possible to respond swiftly to the mask ROM reprogramming request. There is the additional problem that chip area increases, since the EEPROM and the mask ROM must be independently positioned on the memory chip using wiring.

SUMMARY OF THE INVENTION

It is therefore the objective of the present invention to easily execute rewriting of a microcomputer operation program. It is an additional objective of the present invention to prevent CPU malfunctions during time-consuming rewriting of EEPROM data.

It is a further objective of the present invention to reliably perform interrupt processing during rewriting of an operation program.

According to the present invention, in a microcomputer containing a non-volatile memory capable of repeatedly writing in and reading out data and of electrically erasing data which have already been written, a program for rewriting data of a second region of the non-volatile memory is stored in a first region of the non-volatile memory.

Therefore, data stored in the second region can be rewritten by implementing a program stored in the first region. A microcomputer operating program can be easily rewritten once it has been stored in the second region. Moreover, since the microcomputer need only contain an EEPROM, a mask ROM is not required and chip area can thus be reduced.

Furthermore, the CPU can rewrite data stored in the second region by implementing a program command stored in the first region based on the value of a program counter. This program counter value is invalidated while data are being rewritten so that the time-consuming rewriting of data stored in the second region can be carried out reliably. In addition, CPU malfunctions should preferably be prevented while the second region data are being rewritten by for instance stopping the CPU operation clock. Furthermore, CPU should preferably be put on standby and the program counter value maintained at the value corresponding to the start of second region data rewriting in order to reliably prevent CPU malfunction.

Furthermore, when second region data are being rewritten by the execution of a program command, the execution of this program command may be repeatedly executed until rewriting is completed. In this way, if an interrupt request has occurred, this interrupt request can be reliably carried out after the rewriting of the second region data is completed. Moreover, complex software processing such as suspension of program commands is not necessary, thereby reducing errors during program creation.

It is also preferable to provide a counter for controlling the execution sequence of all program commands. When the second region data are being rewritten, the value held in the program counter may alternately be fixed or be to returned to a value held when the rewriting operation began.

Furthermore, interrupt programs should preferably be written in both first and second regions. It is particularly preferable to write in the first region a program for interrupt processing (such as a timer interrupt or an external interrupt or the like) required when rewriting second region data. Interrupt processing required during rewriting of second region data can thereby be reliably carried out.

It is preferable to provide an interrupt vector circuit for the first region and an interrupt vector circuit for the second region and to switch between these depending on whether second region data are presently being rewritten or not. As a result, a single system is sufficient for generating interrupt requests, irrespective of whether second region data are being rewritten or not.

DESCRIPTION OF THE PREFERRED EMBODIMENTS

The preferred embodiments of the present invention will next be explained in detail with reference to the diagrams.

Embodiment 1

Figure 1:
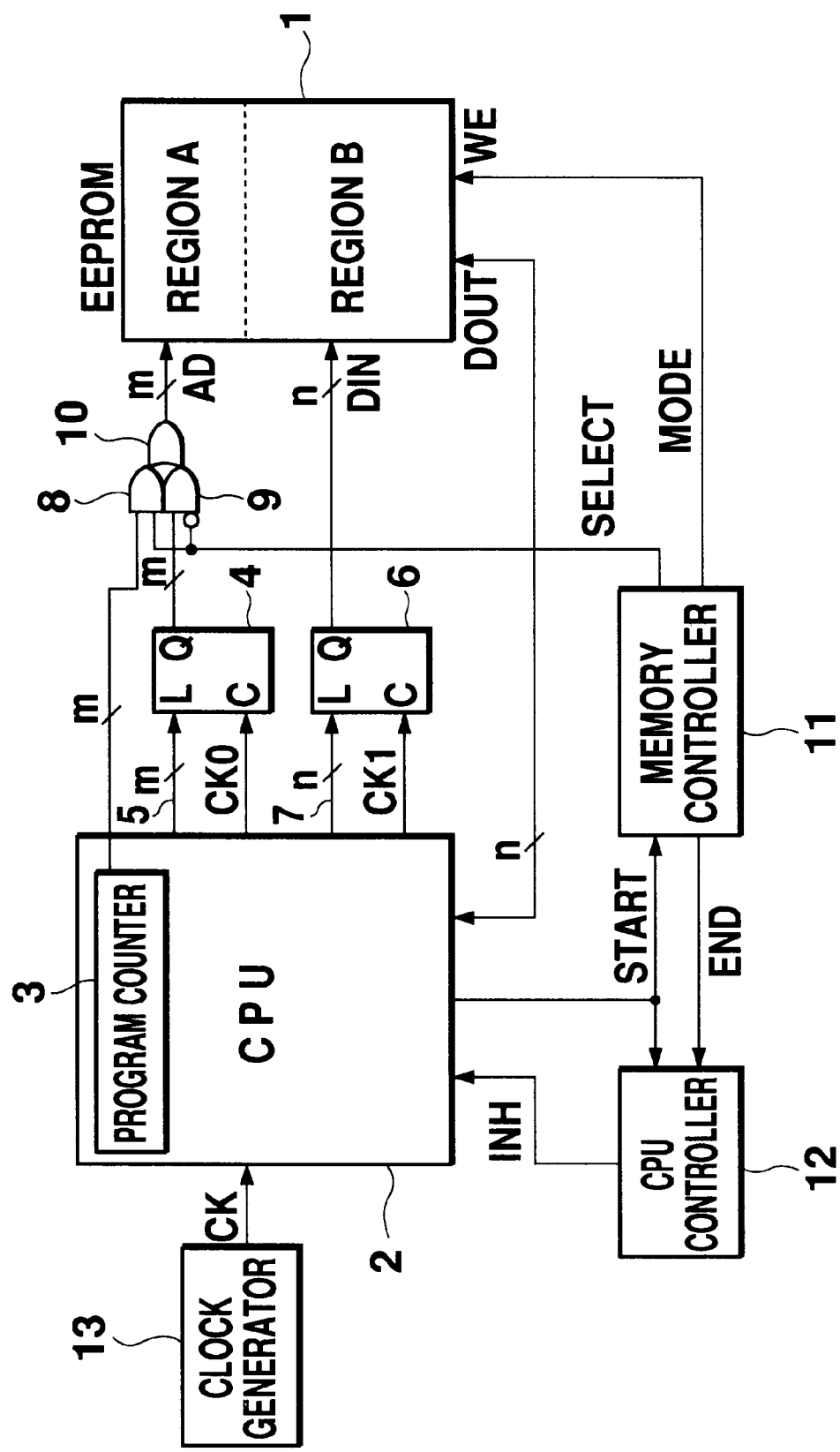
FIG. 1 is a block diagram showing a microcomputer in a first embodiment.
Figure 2:
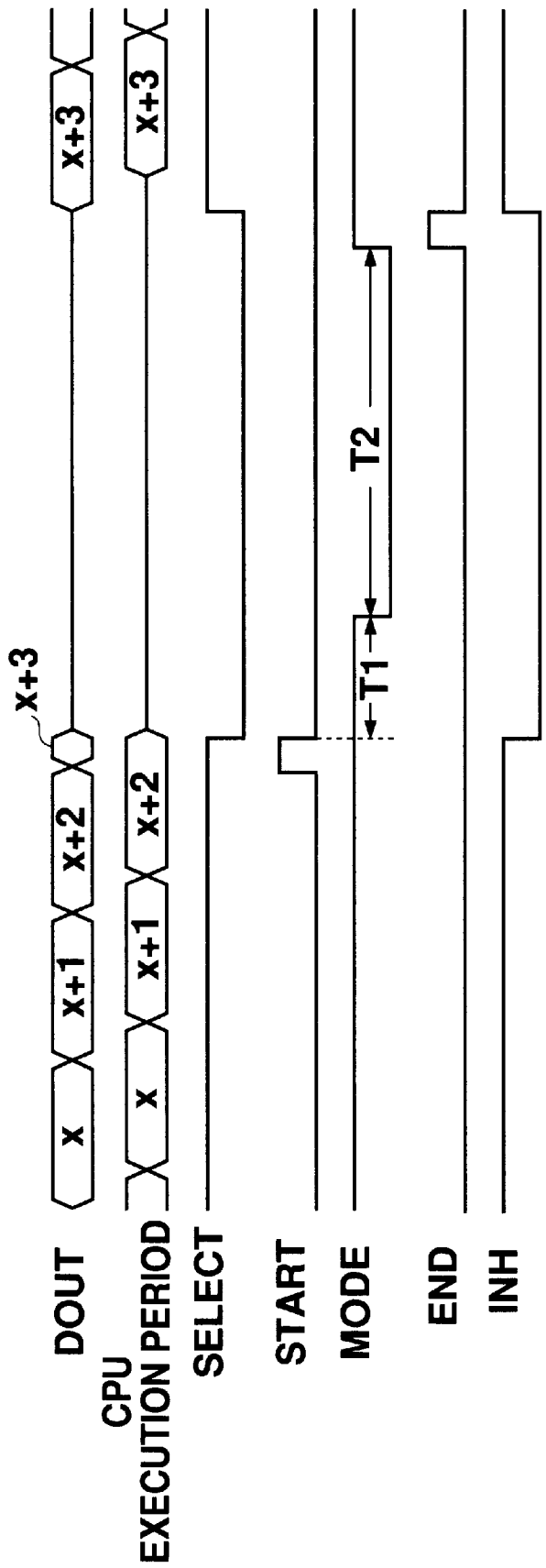
FIG. 2 is a timing chart showing the operation of a microcomputer in the first embodiment.

FIG. 1 shows a circuit block diagram of a microcomputer of the present invention, integrated over a single chip. FIG. 2 is a timing chart to explain the operation of FIG. 1.

In FIG. 1, (1) is an EEPROM. This EEPROM (1) is a non-volatile memory capable of repeatedly reading out and writing in data and also of electrically erasing data which have already been written. A region A within the EEPROM (1) is allocated to contain a program for rewriting data of the remaining region B, which is allocated to store data to be used for operation control programs and the like of the 1-chip microcomputer. The EEPROM (1) has a terminal AD to which address data are applied, a terminal DIN to which write data are applied, a terminal DOUT from which read data area outputted and a terminal WE to which a write mode setting signal is applied. The program in region A of the EEPROM (1) can easily be changed by supplying data from an external PROM writer (not shown in the diagram) to the EEPROM (1) and program changes can thus be dealt with swiftly.

(2) is a CPU which operates in compliance with data read out from the terminal DOUT of the EEPROM (1). This CPU (2) comprises components necessary for executing logic operations such as a program counter (3), an instruction register, an instruction decoder, an OR logic unit and the like.

(4) is a latch circuit. The number of latches provided is equal to the bit number m of the EEPROM (1) address data. Terminal L of the latch (4) is connected to the address terminal of the CPU (2) via m parallel address buses (5) and terminal C is likewise connected to the clock terminal of the CPU (2). In other words, the latch (4) latches address data in synchronism with the clock CK0, thereby functioning as an address holder.

(6) is a latch circuit. The number of latches provided is equal to the bit number n of 1 word ("word" here denotes the bit length of each address of the EEPROM (1), for example 1 bite) of the EEPROM (1). Terminal L of the latch (6) is connected to the address terminal of the CPU (2) via n parallel address buses (7), terminal C is likewise connected to another clock terminal of the CPU (2) and terminal Q is connected to the EEPROM (1) terminal DIN. In other words, the latch (6) latches write data in synchronism with the clock CK1 and supplies these latched data to the EEPROM (1), thereby functioning as a data holder.

AND gates (8) and (9) and OR gate (10) form a switch. The number of switches provided here is equal to the number of latches (4). One of the AND gate (8) input terminals is connected to the output terminal of the program counter (3), one of the AND gate (9) input terminals is connected to the Q terminal of the latch (4) and the output terminal of the OR gate (10) is connected to the terminal ADDRESS of the EEPROM (1). In other words, the switch supplies address data from either the program counter (3) or the latch (4) to the EEPROM (1) in accordance with a select signal SELECT (to be explained below).

(11) is a memory controller (11). When a program command to commence address region B data rewriting has been read out from the EEPROM (1), the CPU (2) decodes the program command and outputs a start pulse START. The memory controller (11) detects the falling edge of the start pulse START, outputs a mode control signal MODE which falls to the low level at time T2 only after a period of time T1 has elapsed from the falling edge and supplies this mode control signal mode control signal MODE to terminal WE of the EEPROM (1). Therefore, the EEPROM (1) is set at write mode only during the period T2 when the mode control signal MODE falls to the low level. Period T2 is set to the time period required for writing data at the address specified by the EEPROM (1). The memory controller (11) detects the rising edge of the mode control signal MODE and outputs an end pulse END. The memory controller (11) outputs a select signal SELECT at the low level only during the period lasting from the falling edge of the start pulse START until the falling edge of the end pulse end pulse END. The switch therefore intercepts the output of the program counter (3) only during the period when the select signal SELECT is at the low level and supplies the output from the latch (4) to the terminal AD of the EEPROM (1).

(12) is a CPU controller. The time required by the EEPROM (1) to execute 1 command is $\mu$ sec units, but the data writing time of the EEPROM (1) is m sec units, i.e. it is extremely long. Consequently, during the period T2 corresponding to EEPROM (1) write mode, it is necessary to inhibit the CPU (2) from being influenced by the undefined output of the EEPROM (1) terminal DOUT and to stop the program counter (3) at its current value. The CPU controller (12) therefore outputs an inhibit signal INH only during the period from the falling edge of the start pulse START to the falling edge of the end pulse END. The CPU (2) detects this inhibit signal INH and performs an inhibit operation in compliance therewith. The inhibit signal INH has the same waveform as the select signal SELECT.

(13) is a clock generator for generating a system clock CK required for CPU (2) operations.

The operation of FIG. 1 will next be explained based on the timing chart shown in FIG. 2. In the initial state, the mode control signal MODE and select signal SELECT output at the high level and the EEPROM (1) is set to read mode for reading out data at an address specified by the program counter (3). Here, program command X is a command to latch address data at latch (4), program command X+1 is a command to latch write data at latch (6) and program command X+2 is a command to write data in the EEPROM (1).

When program command X is read out from terminal DOUT of the EEPROM (1), the CPU (2) decodes program command X and the latch (4) latches the address data in synchronism with the clock CK0.

When the program counter (3) is incremented by +1 and program command X+1 is read out from terminal DOUT of the EEPROM (1), the CPU (2) decodes the program command X+1 and the latch (6) latches the address data in synchronism with the clock CK1.

When the program counter (3) is further incremented by +1 and program command X+2 is read out from terminal DOUT of the EEPROM (1), the CPU (2) decodes the program command X+2 and generates a start pulse START. The select signal SELECT receives the falling edge of the start pulse START and changes to the low level. The mode control signal MODE changes to the low level only at time T2 after a period of time T1 has elapsed since the falling edge of the start pulse START; thereafter, the mode control signal MODE returns to the high level. The end pulse END is generated when the mode control signal MODE returns to the high level and the select signal SELECT changes to the high level when the end pulse END falls to the low level.

An inhibit signal INH is therefore generated during the rewriting of data in region B of the EEPROM (1), enabling the CPU (2) to disregard the influence of the undefined output from the terminal DOUT of the EEPROM (1) and to hold the program counter (3) at the value corresponding to the generation of the start pulse START. As a result, malfunctions in the CPU (2) occurring during EEPROM (1) data rewriting can be prevented.

Means for halting the CPU (2) in standby state, means for stopping the system clock of the CPU (2) and means for returning the program counter (3) to the value of the program counter (3) when the start pulse START was generated using a jump command are all possible methods of preventing malfunctions in the CPU (2) during EEPROM (1) data rewriting.

Figure 3:
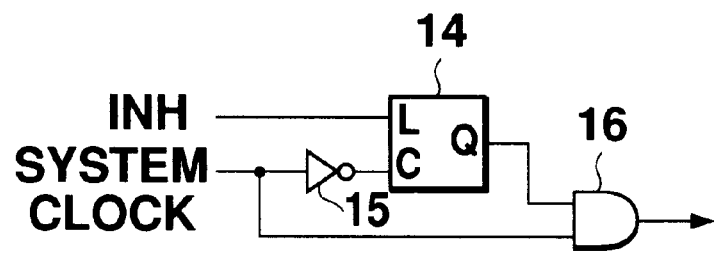
FIG. 3 is a diagram depicting an example of an inhibitor of the first embodiment.

FIG. 3 is a block diagram depicting a concrete example of an inhibitor contained within the CPU (2) for stopping the system clock CK of the CPU (2).

In FIG. 3, an inhibit signal INH with the same waveform as the select signal SELECT is applied to the L terminal of a latch (14) and a system clock CK outputted from a clock generator (13) is applied to the C terminal of the latch (14) through an inverter (15). In other words, the latch (14) latches the inhibit signal INH in synchronism with the falling edge of the system clock CK. An AND gate (16) calculates the logical conjunction of the output from the Q terminal of the latch (14) and the system clock CK. Therefore, the system clock CK and the CPU (2) can both be stopped while the EEPROM (1) is writing data, thereby preventing malfunctions.

Figure 4:
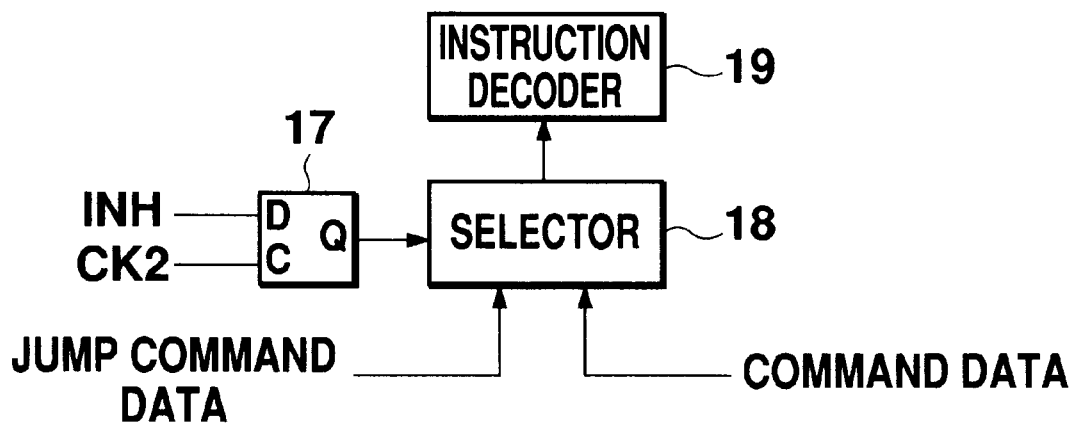
FIG. 4 is a diagram depicting another example of an inhibitor of the first embodiment.

FIG. 4 is a block diagram showing a concrete example of an inhibitor contained within the CPU (2) for returning the value of the program counter (3) to a value corresponding to the generation of the start pulse START using a jump command.

In the diagram (17) is a D flip-flop, to the D terminal of which is applied an inhibit signal INH and to the C terminal of which is applied a clock CK2 generated at each command unit of the CPU (2). Clocks CK0, CK1 and CK2 are generated based on the system clock CK of the clock generator (13). Therefore, the D flip-flop (17) synchronizes the inhibit signal INH to the operation timing of the CPU (2). (18) is a selector for selectively outputting either jump command data fixedly generated using a logic circuit within the CPU (2) or command data read out from the terminal DOUT of the EEPROM (1) based on the output of the Q terminal of the D flip-flop (17). When the D flip-flop (17) Q terminal output is at the low level, the selector (18) selectively outputs jump command data. (19) is an instruction decoder for returning the value of the program counter (3) to a value corresponding to the generation of the start pulse START by decoding jump command data. Therefore, data read out from the terminal DOUT of the EEPROM (1) can be disregarded and the program counter (3) can be held at a value corresponding to the generation of the start pulse START while the EEPROM (1) is writing data. Consequently, when the EEPROM (1) has returned from write mode to read mode, data can be read out from an address corresponding to the generation of the start pulse START.

Therefore, in comparison with a conventional case in which an EEPROM and a mask ROM are integrated over 1 chip, chip area can be reduced by allocating region A of the EEPROM (1) as a program region for rewriting data in the remaining region B data. Furthermore, CPU (2) malfunctions can be reliably prevented while rewriting data in the B region of the EEPROM (1).

Embodiment 2

Figure 5:
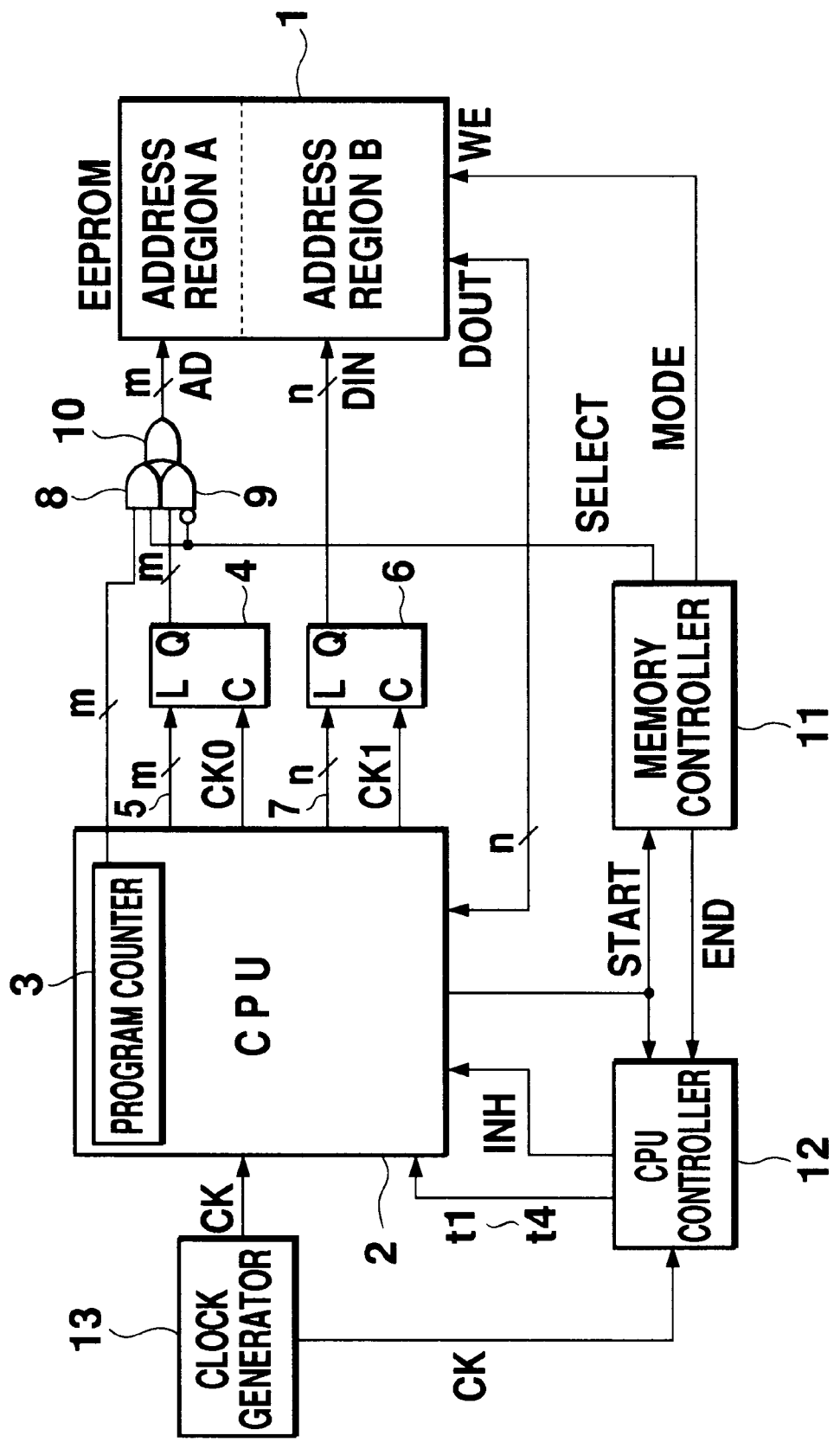
FIG. 5 is a block diagram showing a microcomputer in a second embodiment

FIG. 5 shows a configuration of a second embodiment. The overall configuration is identical to the first embodiment shown in FIG. 1. However, in the second embodiment, in addition to the inhibit signal INH, the CPU controller (12) also supplies counter values t1~t4 to the CPU (2). Furthermore, a system clock CK generated by a clock generator (13) is supplied to the CPU controller (12).

Figure 6:
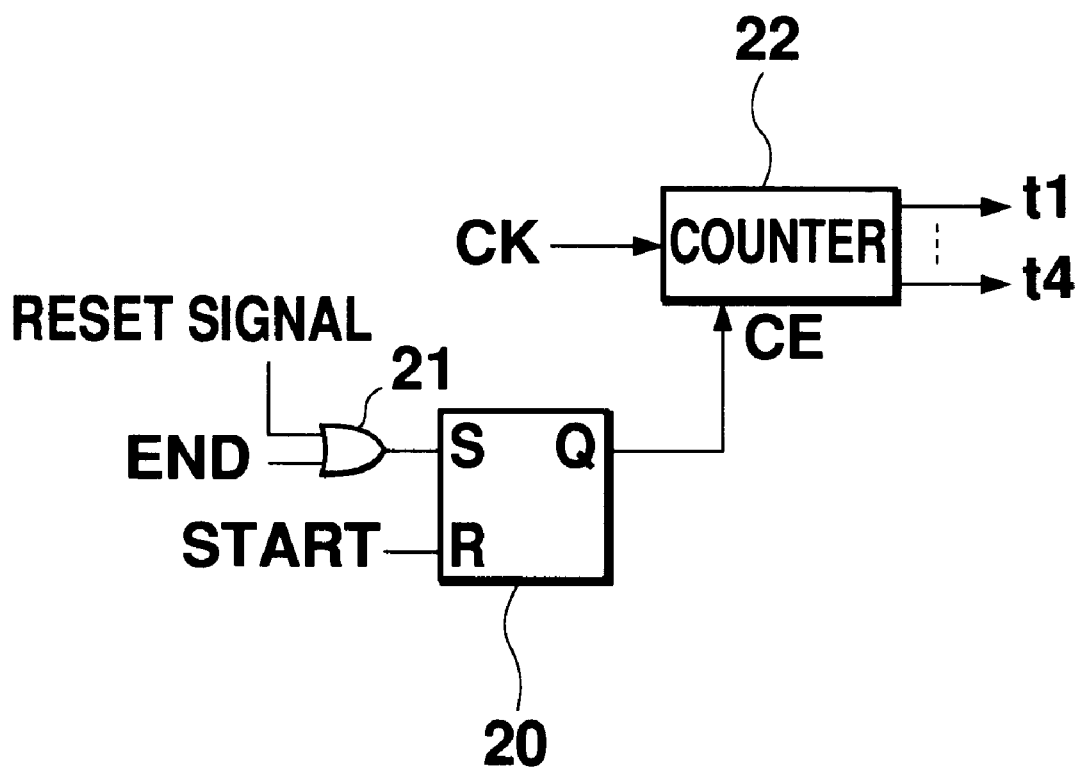
FIG. 6 is a diagram showing an example of a CPU controller in the second embodiment.

FIG. 6 is a circuit block diagram depicting an embodiment of a CPU controller (12). In the diagram, (20) is an RS flip-flop. A start pulse START is applied to the R terminal of the RS flip-flop (20) and an end pulse END and a reset signal (active HIGH) for the microcomputer are applied to the S terminal via an OR gate (21). (22) is a counter for controlling the operation sequence from the reading out of a program command stored in the EEPROM (1) to the execution of the program command. The counter (22) is enabled when the Q terminal of the RS flip-flop (20) rises to the high level, whereafter the counter (22) counts the clock CK and repeatedly generates count values t1~t4 which are then supplied to the instruction decoder contained within the CPU (2). t1 represents the reading period of the program command, during which the CPU (2) generates a read signal READ at the high level. t2 is the decoding period of the program command and t3 is the execution period of the program command. t4 is the period during which the value of the program counter (3) is incremented by +1, during which the CPU (2) generates a signal INC at the high level.

The microcomputer has a 1-word command for decoding 1 program command and executing 1 operation, a 2-word command for continuously decoding 2 program commands and executing 1 operation, and such like. For instance, to execute a 2-word command the counter value of the counter (22) will reach t3.

Figure 7:
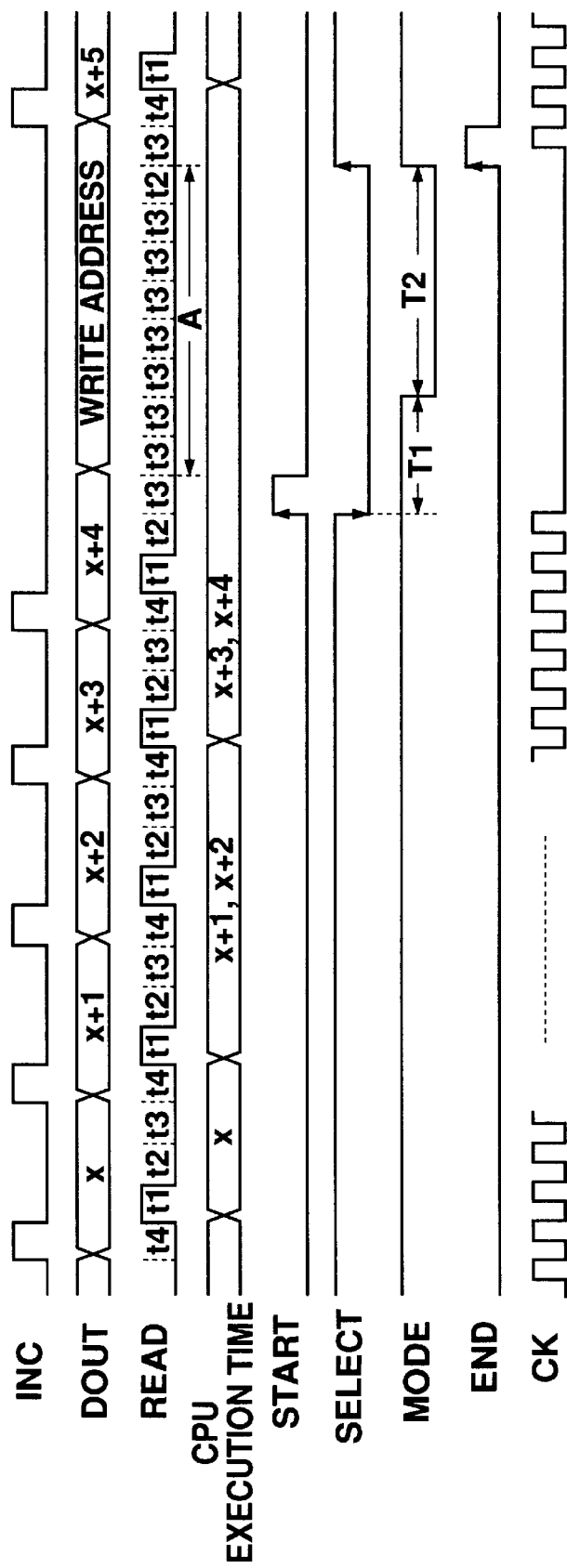
FIG. 7 is a timing chart showing the operation of a microcomputer in the second embodiment.

The operation of FIG. 5 will next be explained based on the timing chart shown in FIG. 7. As in the first embodiment, in the initial state, the mode control signal MODE and select signal SELECT are at the high level and the EEPROM (1) is set to read mode for reading out data at an address specified by the program counter (3). In addition, in the present embodiment, program command X is a 1-word command to latch address data at latch (4), program commands X+1 and X+2 form a 2-word command to latch write data at latch (6) and program commands X+3 and X+4 form a 2-word command to write data in the EEPROM (1).

When program command X is read out from terminal DOUT of the EEPROM (1), the CPU (2) decodes program command X and the latch (4) latches the address data in synchronism with the clock CK0.

When the program counter (3) is incremented by +1 and program command X+1 is read out from terminal DOUT of the EEPROM (1), the CPU (2) decodes the program command X+1. When the program counter (3) is further incremented by +1 and program command X+2 is read out from the terminal DOUT of the EEPROM (1), program command X+2 is also decoded by the CPU (2). As a result, the latch (6) latches the write data in synchronism with the clock CK1.

When the program counter (3) is incremented by +1 and program command X+3 is read out from terminal DOUT of the EEPROM (1), the CPU (2) decodes program command X+3. When the program counter (3) is further incremented by +1 and program command X+4 is read out from the terminal DOUT of the EEPROM (1), program command X+4 is also decoded by the CPU (2). Now, when the count value of the counter (22) again reaches t3 the CPU (2) generates a start pulse START. The select signal SELECT receives the rising edge of the start pulse START and changes to the low level. The mode control signal MODE falls to the low level only at time T2 after a period of time T1 has elapsed since the rising edge of the start pulse START; thereafter, the mode control signal MODE returns to the high level. The end pulse END is generated when the mode control signal MODE returns to the high level. The select signal SELECT changes to the high level when the end pulse END rises to the high level.

Since the counter (22) is disabled and stops at counter value t3 when the start pulse START rises, the CPU (2) ceases generating the signal INC and the read signal READ. In other words, the counter value of the counter (22) is t3 throughout the period A from the fall of the start pulse START to the rise of the end pulse END. Since period A is the program command execution period, the CPU (2) stops the value of the program counter (3) at X+4 in synchronism with the generation of the start pulse START. Thereafter, since the counter (22) is enabled when the CPU (2) generates the end pulse END and the counter value of the counter (22) changes to t4, the value of the program counter (3) becomes X+5 in synchronism with the generation of signal INC. A 2-word command based on program commands X+3 and X+4 is therefore executed repeatedly while the EEPROM (1) is set to write mode.

Consequently, the CPU (2) can disregard the undefined output of the terminal DOUT of the EEPROM (1) and can also hold the program counter (3) at a value corresponding to the generation of the start pulse START. As a result, CPU (2) malfunctions occurring during the rewriting of EEPROM (1) data can be prevented.

Furthermore, since program commands X+3 and X+4 are executed continuously while the EEPROM (1) is set to write mode, when an interrupt request has been received during this period, the interrupt request can be executed reliably after the program commands X+3 and X+4 have been executed.

Moreover, since complex software processing such as suspending program commands is not necessary when the EEPROM (1) is set to write mode, errors occurring during creation of programs can thereby be reduced.

Here, the count value of the counter (22) may be stopped at t3 by using the inhibit signal INH generated simultaneous with the rising edge of the start pulse START to stop the clock CK.

Embodiment 3

As explained above, in a microcomputer according to the first and second embodiments, the EEPROM (1) was divided into regions A and B, wherein a program for rewriting data in region B was stored in region A. The rewriting of data (microcomputer operation programs) stored in region B was thereby simplified.

In the above-mentioned embodiments, a program for executing the interrupt processing was written in region B.

A 1-chip microcomputer of the present embodiment executes rewriting of microcomputer operation programs in region B of the EEPROM (1) by decoding a program command in region A of the EEPROM (1).

However, when an interrupt request (such as timer interrupt or external interrupt) occurs during the rewriting of a program in region B of the EEPROM (1), the problem arises that an interrupt processing program cannot be used since the program in region B has not yet been determined.

This problem is solved in the present embodiment, wherein interrupt processing can be reliably executed based on an interrupt request even when the interrupt request occurs during the rewriting of a region B of a non-volatile memory.

The overall configuration and operation of a microcomputer according to the present embodiment are identical to those of the first embodiment.

Therefore, an inhibit signal INH is generated during the rewriting of data in region B of the EEPROM (1) enabling the CPU (2) to disregard the undefined output of the terminal DOUT of the EEPROM (1) and to stop the system clock thereby holding the program counter (3) at the value corresponding to the generation of the start pulse START. As a result, CPU (2) malfunctions occurring during the rewriting of EEPROM (1) data can be prevented.

Figure 8:
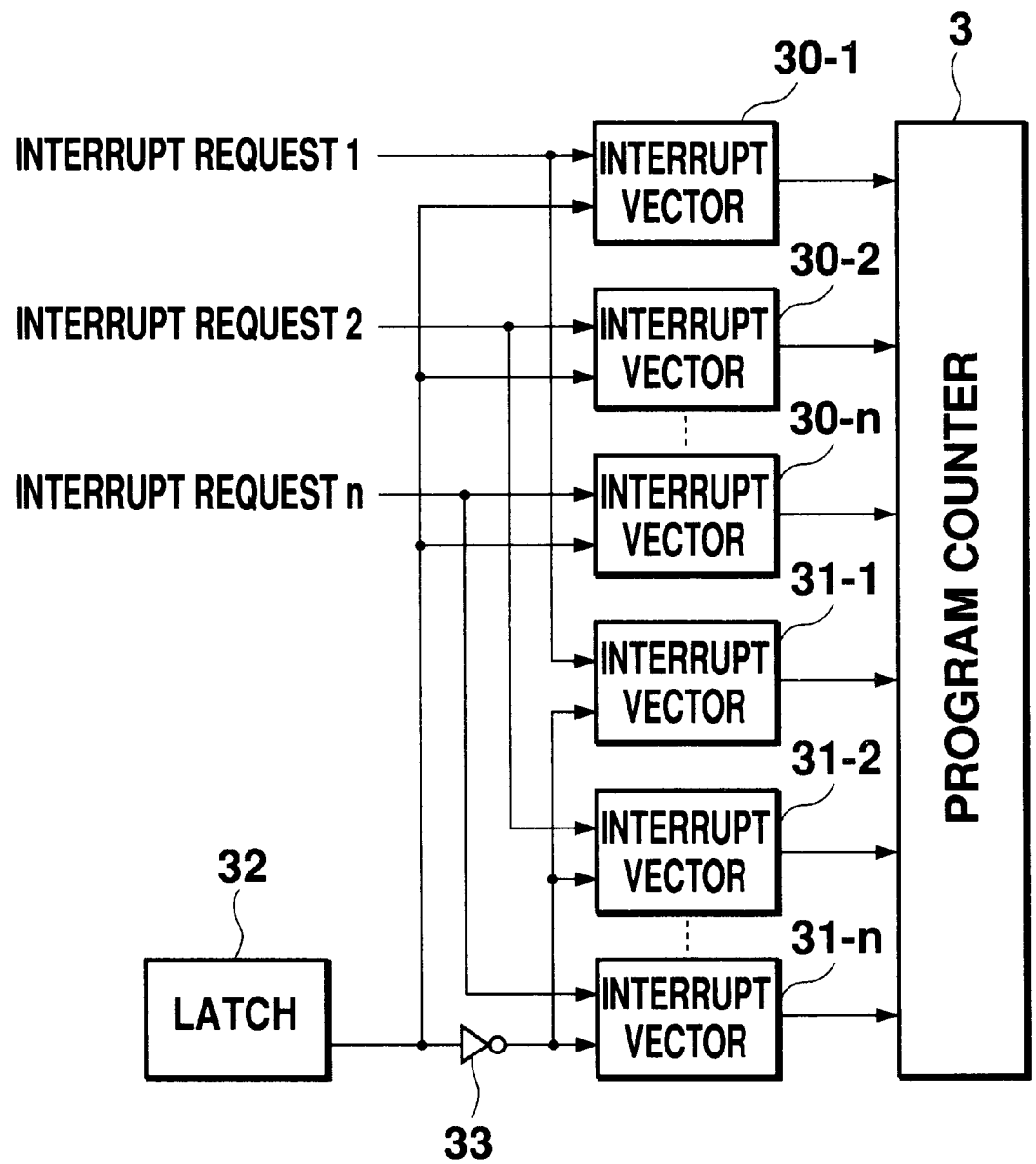
FIG. 8 is a block diagram of a circuit for executing interrupt processing in a third embodiment.
Figure 9:
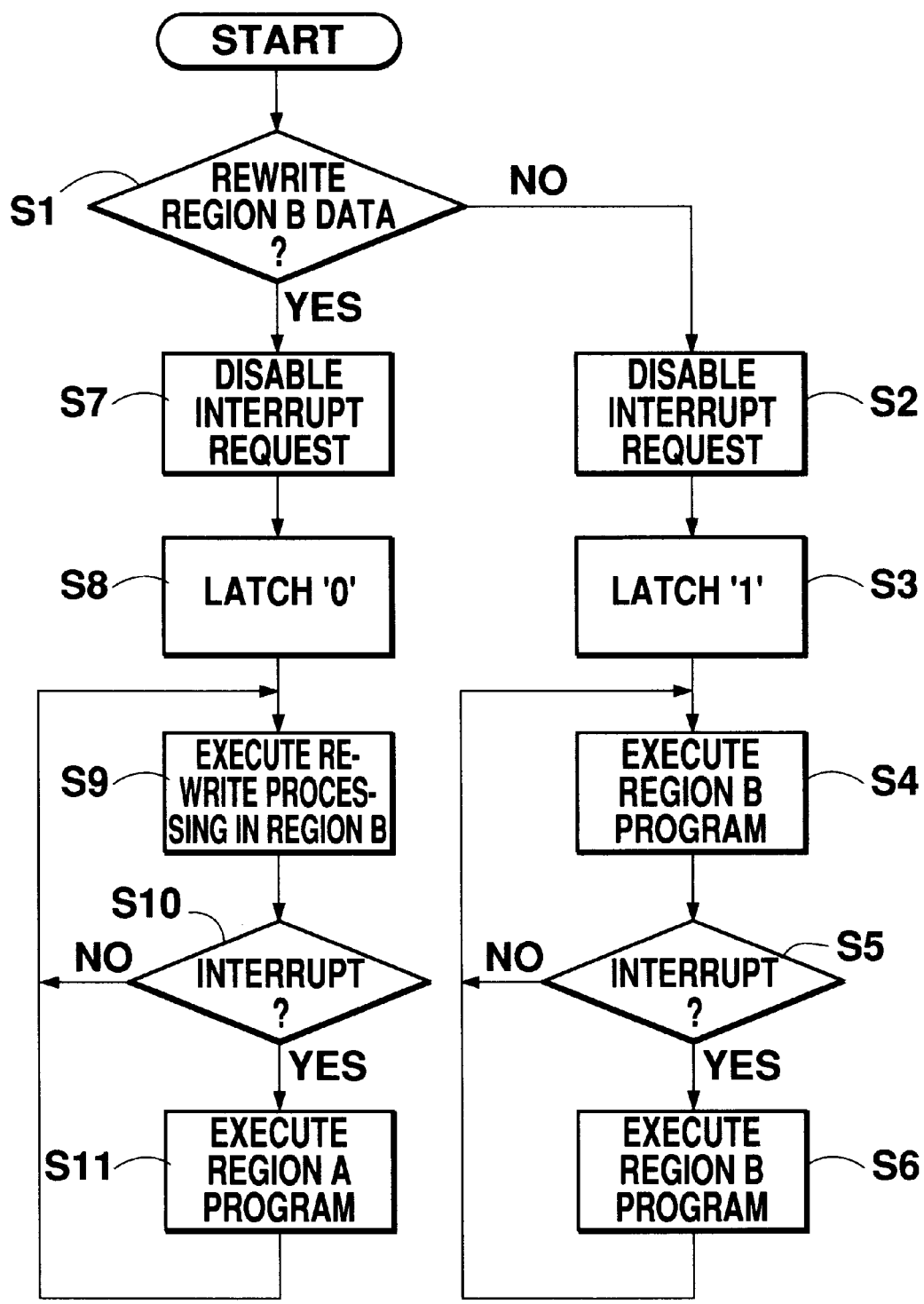
FIG. 9 is a flowchart for explaining interrupt processing in the third embodiment.

FIG. 8 is a block diagram of a circuit for executing interrupt processing contained within the CPU (2) and FIG. 9 is a flowchart for explaining the operation of FIG. 8. In the present embodiment, a program is written in region A of the EEPROM (1) for executing interrupt processing when an interrupt request required when rewriting a program in region B has been generated based on that interrupt request. In addition, a program for executing interrupt processing based on an interrupt request occurring during the execution of a region B program is written in region B.

In FIG. 8, (30-1)~(30-n) are interrupt vectors for changing the value of the program counter (3) to an address in region B of the EEPROM (1) at which interrupt request processing based on interrupt requests 1~n is to be executed. Similarly, (31-1)~(31-n) are interrupt vectors for changing the value of the program counter (3) to an address in region A of the EEPROM (1) at which interrupt request processing based on interrupt requests 1~n is to be executed. (32) is a latch for latching a enable signal to enable either interrupt vectors (30-1)~(30-n) or interrupt vectors (31-1)~(31-n). The output of the latch (32) is jointly connected to the input to interrupt vectors (30-1)~(30-n) and is also jointly connected to the input to interrupt vectors (31-1)~(31-n) via an inverter (33). In other words, interrupt vectors (30-1)~(30-n) are enabled when the latch (32) has latched a logical value of "1" and interrupt vectors (31-1)~(31-n) are enabled when the latch (32) has latched a logical value of "0".

The operation of FIG. 8 will next be explained using the flowchart shown in FIG. 9

When a program in region B of the EEPROM (1) is malfunctioning, the program must be rewritten correctly.

Firstly, the CPU (2) decides whether or not to rewrite data in region B of the EEPROM (1) (S1). When there is no need to rewrite the region B program (S1:NO), all interrupt requests are temporarily disabled (S2) and are then enabled after the latch (32) has latched a logical value of "1" (S3). In other words, interrupt vectors (30-1)~(30-n) are enabled. The program in region B of the EEPROM (1) is then executed (S4). When any one of interrupt requests 1~n is generated during execution of the program (S5:YES), the value of the program counter (3) is changed to an address in region B of the EEPROM (1) corresponding to the interrupt request and interrupt processing is executed based on this interrupt request (S6).

Alternatively, when a program in region B of the EEPROM (1) is to be rewritten (S1:YES), all interrupt requests are temporarily disabled (S7) and are then enabled after the latch (32) has latched a logical value of "0" (S8). In other words, interrupt vectors (31-1)~(31-n) are enabled. The program in region B of the EEPROM (1) is then rewritten according to the program in region A (S9). When any one of interrupt requests 1~n is generated during execution of the program (an interrupt request required when rewriting the program in region B of the EEPROM (1)) (S10:ES), the value of the program counter (3) is changed to an address in region A of the EEPROM (1) corresponding to the interrupt request and interrupt processing is executed based on this interrupt request (S11). When rewriting of the program in region B of the EEPROM (1) has ended, the 1-chip microcomputer is reset and executes operation after decoding the program in region B of the EEPROM (1) based on the decoded program.

Thus, when an interrupt request (such as a timer interrupt or an external interrupt) required in the rewriting process of a program in region B of the EEPROM (1) has been generated during the rewriting of the program, interrupt processing based on the interrupt request can be executed reliably. Furthermore, interrupt requests 1~n can be utilized together to improve program efficiency both in cases when a program in region B of the EEPROM (1) is to be rewritten and in cases when no such rewriting is carried out.

In the above explanation, the program counter (3) was incremented each time by a value of +1 when reading out a program from the EEPROM (1), but there are also cases in which the increment value is another predetermined value.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A microcomputer containing a non-volatile memory capable of repeatedly writing and reading data and also of electrically erasing data which have already been written, wherein a program for rewriting data in a second region of the non-volatile memory is stored in a first region of the non-volatile memory, the microcomputer comprising:
    a CPU for carrying out processing in order to rewrite data stored in the second region of the non-volatile memory based on a command read out from the first region of the non-volatile memory; and
    a CPU controller for inhibiting the CPU from reading out the next command from the first region of the non-volatile memory during rewrite processing of the second region of the non-volatile memory.

2. A microcomputer containing a non-volatile memory capable of repeatedly writing and reading data and also of electrically erasing data which have already been written, wherein
    a program for rewriting data in a second region of the non-volatile memory is stored in a first region of the non-volatile memory, the microcomputer further comprising:
    a CPU for sequentially executing program commands read out from the first region of the non-volatile memory, wherein the CPU has a program counter for controlling the execution of a plurality of program commands containing in the program;
    an address holder for holding address data to be rewritten in the non-volatile memory which are supplied to the address holder by the CPU;
    a data holder for holding non-volatile memory rewrite data supplied thereto from the CPU;
    a memory controller for setting the non-volatile memory to write mode and invalidating the output of the program counter only for a period of time necessary for rewriting data when a program command to commence rewriting of second region data has been read out from the first region of the non-volatile memory, and for controlling the writing of the data holder data at an address in the non-volatile memory specified by the address holder; and
    a CPU controller for inhibiting the CPU from being influenced by undefined output read out from the non-volatile memory when the non-volatile memory has been set to write mode.

3. A microcomputer according to claim 2, wherein the CPU controller switches the CPU to standby when the non-volatile memory is set to write mode.

4. A microcomputer according to claim 2, wherein the CPU controller stops the CPU operation clock when the non-volatile memory is set to write mode.

5. A microcomputer according to claim 2, wherein when the non-volatile memory is set to write mode, the CPU controller sets a value of the program counter value to be an address when the non-volatile memory was set to write mode and repeatedly outputs a jump command.

6. A microcomputer containing a non-volatile memory capable of repeatedly writing and reading data and also of electrically erasing data which have already been written, wherein
    a program for rewriting data in a second region of the non-volatile memory is stored in a first region of the non-volatile memory, and
    the microcomputer rewrites data stored in the second region of the non-volatile memory by executing a plurality of program commands contained in the program written in the first region and continues to execute these program commands repeatedly throughout the rewriting of the second region data,
    the microcomputer further comprising:
    a CPU which has a program counter for specifying a program command to be executed from among the plurality of program commands, wherein the CPU operates based on a program command which has been read out from the first region of the non-volatile memory based on the output of this program counter;
    an address holder for holding address data to be rewritten in the non-volatile memory which are supplied thereto from the CPU;
    a data holder for holding non-volatile memory rewrite data supplied thereto from the CPU;
    a memory controller for setting the non-volatile memory to write mode and also deeming the output of the program counter to be invalid only for a period of time necessary for rewriting data when a program command to commence rewriting of second region data has been read out from the first region of the non-volatile memory, and for controlling the writing of the data holder data at an address in the non-volatile memory specified by the address holder; and
    a CPU controller for executing said program command continuously so as to fix a value of said program counter when the non-volatile memory has been set to write mode.

7. A microcomputer according to claim 6, wherein the CPU controller stops the CPU operation clock when the non-volatile memory is set to write mode.

8. A microcomputer according to claim 6, wherein the CPU controller has a counter for controlling the execution sequence of each program command when the non-volatile memory is set to write mode; and
the CPU stops the counter when a program to set the non-volatile memory to write mode has been executed and sets the program counter at a fixed value based on the value of the counter.

9. A microcomputer containing a non-volatile memory capable of repeatedly writing and reading data and also of electrically erasing data which have already been written, wherein a program for rewriting data in a second region of the non-volatile memory is stored in a first region of the non-volatile memory, and the first address region and the second address region of the non-volatile memory contain program regions for interrupt processing, the microcomputer further comprises:
  a program counter for specifying an address within the non-volatile memory,
  an interrupt vector for changing the value of the program counter in response to an interrupt request; and
  a controller for controlling the interrupt vector in order to specify a first address region within the non-volatile memory when the interrupt request has been generated during rewriting of data in the second address region of the non-volatile memory.

10. A microcomputer according to claim 9, wherein a program for interrupt processing stored in the first address region of the non-volatile memory is required in order to rewrite data of the second address region of the non-volatile memory.

11. A microcomputer according to claim 10, wherein two interrupt vectors for specifying first and second address regions of the non-volatile memory are provided for one interrupt request; and the controller selects one of the two interrupt vectors to specify the first address region of the non-volatile memory when the interrupt request has been generated during rewriting of data in the second address region of the non-volatile memory.

12. A microcomputer according to claim 11, wherein the controller selects the other interrupt vector to specify the second address region of the non-volatile memory when the interrupt request has been generated during not rewriting of data in the second address region.

* * * * *